US012568357B2

(12) United States Patent
Hoque et al.

(10) Patent No.: US 12,568,357 B2
(45) Date of Patent: Mar. 3, 2026

(54) CHIRP-BASED OVER-THE-AIR COMPUTATION FOR PRIVACY-PRESERVING DISTRIBUTED LOCALIZATION

(71) Applicant: UNIVERSITY OF SOUTH CAROLINA, Columbia, SC (US)

(72) Inventors: Safi Shams M Hoque, Columbia, SC (US); Alphan Sahin, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 123 days.

(21) Appl. No.: 18/396,784

(22) Filed: Dec. 27, 2023

(65) Prior Publication Data

US 2024/0236657 A1     Jul. 11, 2024

Related U.S. Application Data

(60) Provisional application No. 63/594,597, filed on Oct. 31, 2023, provisional application No. 63/437,774, filed on Jan. 9, 2023.

(51) Int. Cl.
*H04W 12/02* (2009.01)
*H04W 84/18* (2009.01)

(52) U.S. Cl.
CPC ............ *H04W 12/02* (2013.01); *H04W 84/18* (2013.01)

(58) Field of Classification Search
CPC .............................. H04W 12/02; H04W 84/18
See application file for complete search history.

(56) References Cited

U.S. PATENT DOCUMENTS 11,652,679 B2 * 5/2023 Sahin ................... H04L 27/2626
375/139
2014/0378164 A1 * 12/2014 Holm ...................... H04W 4/02
455/456.2

(Continued)

FOREIGN PATENT DOCUMENTS

WO     WO-2011056218 A2 * 5/2011     ............ H04W 64/00

OTHER PUBLICATIONS

A Survey on Mobile Anchor Node Assisted Localization in Wireless Sensor Networks (Year: 2016).*

(Continued)

*Primary Examiner* — Shirley X Zhang
(74) *Attorney, Agent, or Firm* — DORITY & MANNING, P.A.

(57)     ABSTRACT

The disclosure deals with method and system for an over-the-air computation (OAC) approach for privacy-preserving localization in a sensor network. The disclosed approach relies on a voting-based distributed localization and the computation of the majority votes (MVs) with OAC. In this method, the anchor node (AN)'s votes encoding the potential location of a server node (SN) are mapped to a circularly-shifted chirp (CSC) signal and all AN simultaneously transmit their CSC signals. The aggregated signal is received at the SN and the MV votes are detected non-coherently without requiring an ideal time-synchronization or channel state information (CSI). We further disclose an iterative refinement procedure to increase the localization performance. The CSCs result in spectral-efficient and power-efficient transmission, while disclosed iterative refinements and repetitions decrease the gap between the root-mean-square error (RMSE) and the quantization bound.

22 Claims, 5 Drawing Sheets

(56) References Cited

U.S. PATENT DOCUMENTS

| | | | |
|---|---|---|---|
| 2020/0271747 A1* | 8/2020 | Wu | G01P 15/18 |
| 2022/0337972 A1* | 10/2022 | Karmanov | G01S 5/0278 |
| 2023/0214667 A1* | 7/2023 | Hoque | G06N 3/0464 |
| | | | 706/12 |
| 2024/0020968 A1* | 1/2024 | Haskin | G06F 16/29 |

OTHER PUBLICATIONS

Distributed Localization in Wireless Sensor Networks: A Quantitative Comparison (Year: 2003).*

He et al. Abstract For "Range-free localization schemes for large scale sensor networks," in Proc. ACM International Conference on Mobile Computing and Networking. New York, NY, USA: Association for Computing Machinery, 2003, pp. 81-95.

Hellstrom et al. "Wireless for machine learning: A survey," Foundations and Trends in Signal Processing, vol. 15, No. 4, pp. 290-399, 2022.

Hoque et al. "Chirp-based over-the-air computation for long-range federated edge learning," in Proc. IEEE International Symposium on Personal, Indoor and Mobile Radio Communications (PIMRC), Sep. 2022, pp. 1-7.

Liu et al. "Attack-resistant location estimation in sensor networks," in IPSN 2005. Fourth International Symposium on Information Processing in Sensor Networks, 2005. IEEE, 2005, pp. 99-106.

Sahin et al. "Distributed learning over a wireless network with FSK-based majority vote," in Proc. IEEE International Conference on Advanced Communication Technologies and Networking (CommNet), Dec. 2021, pp. 1-9.

Sahin et al. Abstract For "Over-the-air computation with DFT-spread OFDM for federated edge learning," in Proc. IEEE Wireless Communications and Networking Conf. (WCNC), Apr. 2022, pp. 1-6.

Sahin et al. Abstract For "DFT-Spread-OFDM-based chirp transmission," IEEE Communications Letters, vol. 25, No. 3, pp. 902-906, 2021.

Shi et al. Abstract For "Resilient privacy-preserving distributed localization against dishonest nodes in internet of things," IEEE Internet of Things Journal, vol. 7, No. 9, pp. 9214-9223, 2020.

Shu et al. Abstract For "Multi-lateral privacy-preserving localization in pervasive environments," in IEEE Infocom 2014-IEEE Conference on Computer Communications. IEEE, 2014, pp. 2319-2327.

Zhu et al. "One-bit over-the-air aggregation for communication-efficient federated edge learning: Design and convergence analysis," IEEE Trans. Wireless Commun., vol. 20, No. 3, pp. 2120-2135, Nov. 2021.

Zhu et al. "Broadband analog aggregation for low-latency federated edge learning," IEEE Trans. Wireless Commun., vol. 19, No. 1, pp. 491-506, Jan. 2020.

* cited by examiner

---

Figure 2:
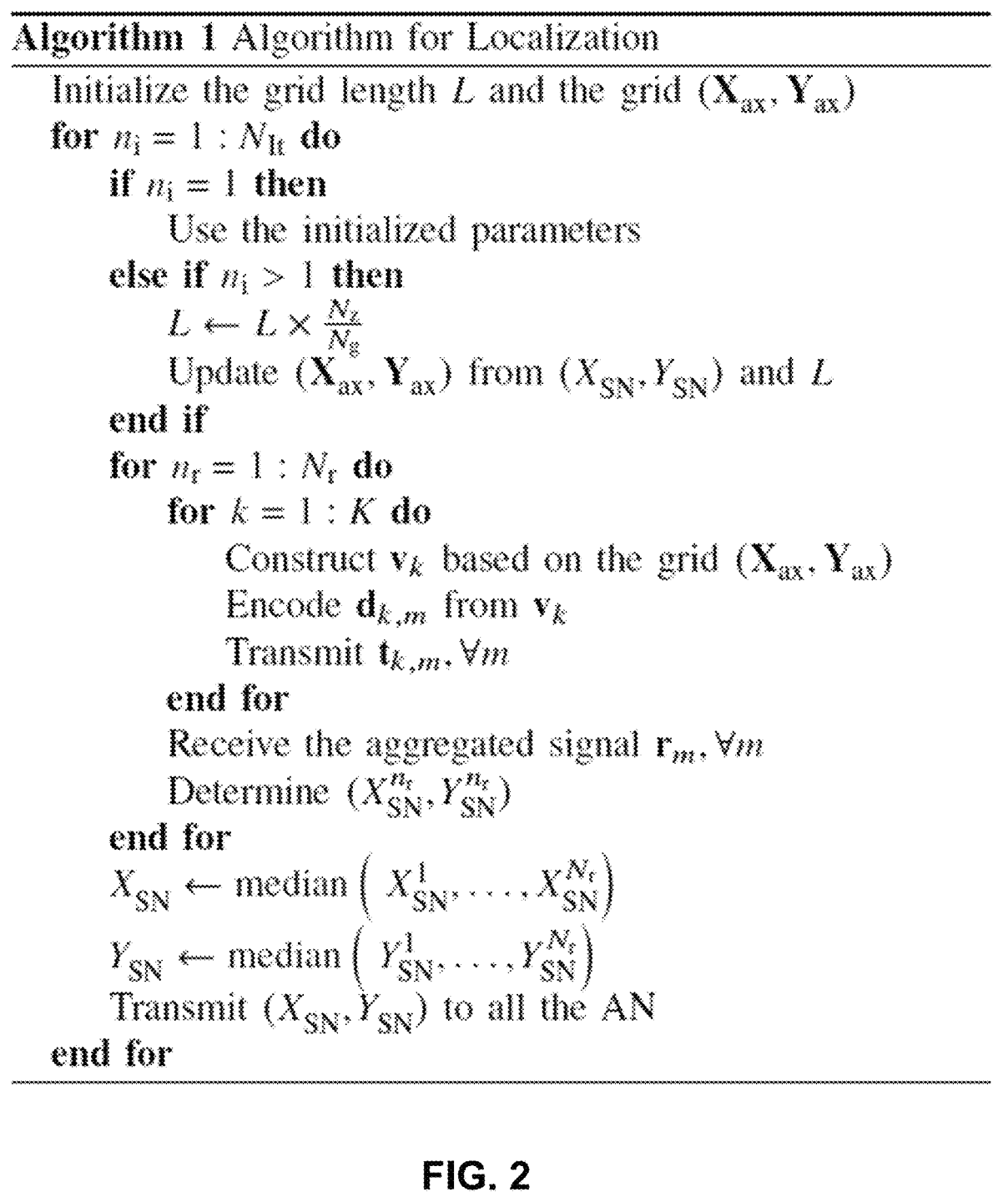

Algorithm 1 Algorithm for Localization

---

Initialize the grid length $L$ and the grid $(\mathbf{X}_{ax}, \mathbf{Y}_{ax})$ for $n_i = 1 : N_{It}$ do if $n_i = 1$ then

Use the initialized parameters else if $n_i > 1$ then

$L \leftarrow L \times \frac{N_z}{N_g}$

Update $(\mathbf{X}_{ax}, \mathbf{Y}_{ax})$ from $(X_{SN}, Y_{SN})$ and $L$ end if for $n_r = 1 : N_r$ do for $k = 1 : K$ do

Construct $\mathbf{v}_k$ based on the grid $(\mathbf{X}_{ax}, \mathbf{Y}_{ax})$

Encode $\mathbf{d}_{k,m}$ from $\mathbf{v}_k$

Transmit $\mathbf{t}_{k,m}, \forall m$ end for

Receive the aggregated signal $\mathbf{r}_m, \forall m$

Determine $(X_{SN}^{n_r}, Y_{SN}^{n_r})$ end for

$X_{SN} \leftarrow \text{median}\left( X_{SN}^1, \ldots, X_{SN}^{N_r} \right)$ $Y_{SN} \leftarrow \text{median}\left( Y_{SN}^1, \ldots, Y_{SN}^{N_r} \right)$ Transmit $(X_{SN}, Y_{SN})$ to all the AN end for

CHIRP-BASED OVER-THE-AIR COMPUTATION FOR PRIVACY-PRESERVING DISTRIBUTED LOCALIZATION

PRIORITY CLAIMS

The present application claims the benefit of priority of U.S. Provisional Patent Application No. 63/437,774, filed Jan. 9, 2023, entitled Methods for Privacy-Preserving Distributed Localization with Chirp-Based Over-The-Air Computation, and the benefit of priority of U.S. Provisional Patent Application No. 63/594,597, filed Oct. 31, 2023, entitled Chirp-Based Over-The-Air Computation for Privacy-Preserving Distributed Localization, and both of which are fully incorporated herein by reference for all purposes.

BACKGROUND OF THE PRESENTLY DISCLOSED SUBJECT MATTER

The presently disclosed subject matter generally relates to methodologies and corresponding apparatus for over-the-air computation (OAC) approaches for privacy-preserving localization in a sensor network.

I. INTRODUCTION

Distributed localization in wireless sensor networks (WSNs) is one of the fundamental applications of the Internet-of-Things (IoT) networks. Privacy preservation and localization accuracy are the key aspects of distributed localization. Also, several communication-related metrics like power efficiency, latency, and spectral efficiency play important roles in the design. In the literature, many studies investigate distributed localization from the perspective of security, e.g., [1]-[4]. In [1], the authors propose a range-free localization as a cost-effective solution for low-complexity WSN. However, the privacy issue is not addressed. The authors in [2] propose a voting-based localization that can withstand malicious beacon nodes. However, the target node needs to store all the local data, which undermines privacy and requires a storage overhead. The authors of [3] propose a cryptographic encryption based privacy preservation for localization. However, such encryption scheme is not suitable for low-complexity sensors. In [4], a resilient privacy-preserving distributed localization algorithm that provides robustness against malicious nodes and preserves privacy is proposed. However, the computation complexity increases with the number of nodes. Another concern with the schemes in [1]-[4] is that the latency increases linearly with the number of sensors. In this presently disclosed subject matter, we disclose an over-the-air computation (OAC)-based solution that can mitigate the latency problems while promoting the privacy of the data at the sensors for localization.

OAC has been recently investigated in the literature for distributed learning applications (e.g., federated edge learning (FEEL)). In [5], an analog aggregation framework is proposed, where the neural network parameters are transmitted over orthogonal frequency division multiplexing (OFDM) subcarriers and aggregated over the air. To mitigate the impact of multi-path fading, truncated-channel inversion (TCI) is used, in which the symbols on the OFDM subcarriers are multiplied by the inverse of the channel coefficients, and the fading subcarriers are avoided. In [6], distributed training based on majority vote (MV) is considered. Similarly, TCI is adopted in this presently disclosed subject matter. In [7], [8], the authors propose to use orthogonal signaling for MV computation, where the MV is calculated with a non-coherent energy accumulation over orthogonal resources. The presently disclosed methods do not rely on channel state informations (CSIs) and therefore, are resistant to time-synchronization issues. However, there is a cause for concern due to the high peak-to-mean envelope power ratio (PMEPR) of the OFDM transmissions. In [9], a low PMEPR circularly-shifted chirp (CSC)-based OAC is investigated for FEEL to improve power efficiency. However, such prior scheme has relatively low spectral efficiency which can jeopardize the advantages of OAC. We believe OAC is not utilized for distributed localization.

Some prior literature discloses anchor-based localization techniques. However, unlike the presently disclosed methodology, they do not address the privacy, accuracy, latency, power efficiency, and spectral efficiency concerns of the wireless sensor networks at the same time.

SUMMARY OF THE PRESENTLY DISCLOSED SUBJECT MATTER

Generally, the presently disclosed subject matter addresses the privacy-preservation and latency problem in a distribution localization scenario over wireless sensor networks. In particular, the presently disclosed subject matter utilizes over-the-air computation to preserve privacy and reduce latency. The power and spectral efficiency of the presently disclosed subject matter makes it suitable for low-power devices. Another advantage is that the computational complexity of the presently disclosed subject matter is simple as it does not rely on perfect time synchronization of the devices or availability of the channel state information, which makes the presently disclosed subject matter suitable for very low-complexity IoT sensors.

The presently disclosed systems and corresponding and/or associated methodology disclose an over-the-air computation (OAC) approach for privacy-preserving localization in a sensor network. The disclosed approach relies on a voting-based distributed localization and the computation of the majority votes (MVs) with OAC. In the presently disclosed method, the anchor node (AN)'s votes encoding the potential location of a server node (SN) are mapped to a circularly-shifted chirp (CSC) signal and all AN simultaneously transmit their CSC signals. The aggregated signal is received at the SN and the MV votes are detected non-coherently without requiring an ideal time-synchronization or channel state information (CSI). An iterative refinement procedure is also disclosed to increase the localization performance. The CSCs result in spectral-efficient and power-efficient transmission, while the disclosed iterative refinements and repetitions decrease the gap between the root-mean-square error (RMSE) and the quantization bound.

Distributed localization can enable new positioning and location awareness-based applications for Internet of things (IoT) in wireless sensor networks (WSNs). For distributed localization, many anchor nodes participate in estimating the location of a target node. Privacy and latency are some of the key challenges of distributed localization. Over-the-air computation (OAC), which takes advantage of the wireless multiple access channel's signal superposition feature, can be utilized for privacy-preserving low latency localization. There are other communication concerns like power efficiency, spectral efficiency, and time-synchronization issues. We presently disclose an OAC approach to overcome these concerns through circularly-shifted chirp (CSC). The presently disclosed scheme also does not rely on the availability of channel state information (CSI) that can significantly reduce complexity of the design.

One exemplary embodiment disclosed herewith relates to an over-the-air computation methodology for privacy-preserving localization in a sensor network without using channel state information (CSI) at a plurality of anchor nodes (ANs) or at a server node (SN).

It is to be understood that the presently disclosed subject matter equally relates to associated and/or corresponding methodologies. One exemplary such method relates to methodology for privacy-preserving localization in a sensor network without using channel state information (CSI) at a plurality of anchor nodes (ANs) or at a server node (SN). Such exemplary methodology preferably comprises providing an over-the-air computation network with update vectors received at a server node (SN) as transmitted from a plurality of anchor nodes (ANs); providing one or more processors; and providing one or more non-transitory computer-readable media that store instructions that, when executed by the one or more processors, cause the one or more processors to perform operations. Such operations preferably comprise transmitting local vectors as votes from each respective of the plurality of anchor nodes (ANs), receiving the superposed update vector at the server node (SN), and determining the majority vote (MV) for each element of the update vector at the server node (SN). Further preferably, the transmitted local vectors comprise respective circularly-shifted chirp (CSC) signals, each transmitted simultaneously from all of the ANs.

Other example aspects of the present disclosure are directed to systems, apparatus, tangible, non-transitory computer-readable media, user interfaces, memory devices, and electronic devices for over-the-air computation for privacy-preserving distributed localization. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to a system for over-the-air computation system for privacy-preserving localization in a sensor network without using channel state information (CSI) at a plurality of anchor nodes (ANs) or at a server node (SN). Such system preferably comprises an over-the-air computation network to process update vectors received at a server node (SN) as transmitted from a plurality of anchor nodes (ANs); one or more processors; and one or more non-transitory computer-readable media that store instructions that, when executed by the one or more processors, cause the one or more processors to perform operations, the operations comprising transmitting local vectors as votes from each respective of the plurality of anchor nodes (ANs), receiving the superposed update vector at the server node (SN), and determining the majority vote (MV) for each element of the update vector at the server node (SN). Further, the transmitted local vectors preferably comprise respective circularly-shifted chirp (CSC) signals, each transmitted simultaneously from all of the ANs.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 2 is an example of a presently disclosed algorithm for localization;

Figure 1:
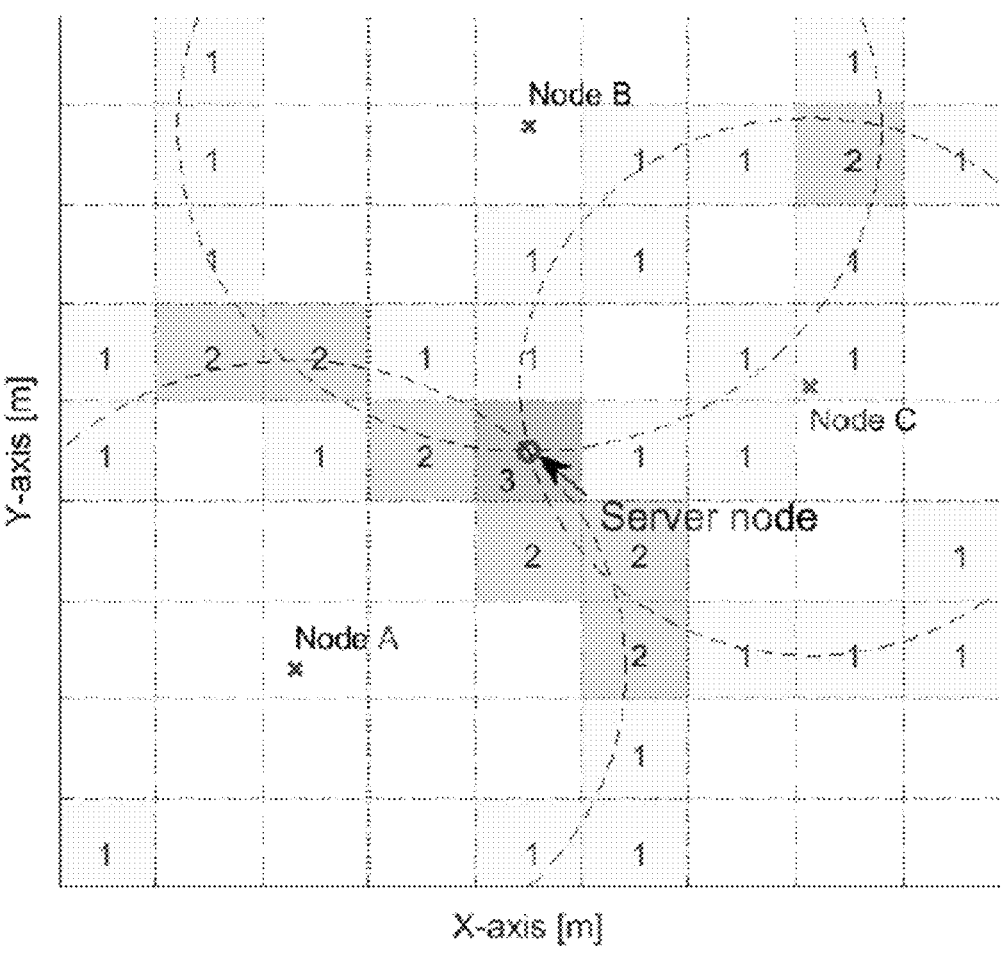
FIG. 1 is a graph of an example of majority vote (MV)-based localization for a 2D case.

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a system which is a circularly-shifted chirp (CSC)-based over-the-air computation (OAC) for privacy-preserving distributed localization.

In particular, we disclose an OAC approach based on CSCs and utilize it to achieve privacy-preserving distributed localization. Presently disclosed contributions summarized in certain respects may be listed as follows:

Spectrally-efficient chirp-based OAC: Motivated by the constant envelope nature of the chirp waveforms for WSNs, we develop a CSC-based OAC method to aggregate the local votes transmitted from anchor nodes (ANs) and compute the MV. The presently disclosed encoder improves the encoder in [9] to utilize the CSCs as efficiently as possible by encoding multiple votes into a CSC. The presently disclosed scheme is also based on non-coherent energy detection and does not rely on the availability of CSI at the AN or server node (SN). It also does not require phase synchronization, making it useful in practical systems.

Privacy-preserving localization: Based on the presently disclosed OAC scheme, we present a localization method for WSN. We also incorporate multiple iterations and repetitions to enhance the resolution of the localization and increase the detection probability, respectively. We demonstrate that we can minimize the root-mean-square error (RMSE) that is comparable to the quantization bound.

II. SYSTEM MODEL

A. Localization Scenario and Problem Formulation

Consider an L×L rectangular area with K ANs and an SN, where L is the length in meters on the x-axis and y-axis. Assume that each AN and SN are equipped with a single antenna. We also assume that each AN is aware of its location, e.g., through a Global Positioning System (GPS) or fixed configuration. The ANs can also measure their distance from the SN, e.g., by using methods based on the received signal strength indicator (RSSI), time of arrival (ToA) or time difference of arrival (TDoA) [10]. We assume that SN is mobile and desires to identify its location via the feedback signals from ANs without accessing the local information at the ANs to promote the privacy of the local data.

In this present disclosure, we consider the voting-based localization discussed in [2]. In this approach, the area is first divided into $N_g \times N_g$ cells. Each AN takes part in a voting process occurring at the SN and votes for the potential cells where the SN may be located in. To elaborate the voting process rigorously, let $A_x$ (a, b, $N_g$) denote an arithmetic sequence of $N_g$ elements with the first element a and the last element b. Since each AN is aware of its position and its distance from the target, it can determine whether a cell is a potential candidate for the SN's location. Each cell is assigned to either 1 or 0 if it is a candidate cell or not, respectively. Let $v_{n_x,n_y}{}^k$ be the assigned value for the cell with the indices $n_x \in \{0, \ldots, N_g-1\}$ and $n_y \in \{0, \ldots, N_g-1\}$ on the x-axis and y-axis for the kth AN, respectively. Also, let i be the linear cell index that assigns a unique integer to each cell as $i=n_x+N_g n_y$, $\forall i \in \{0, \ldots, N_g{}^2-1\}$. We then equivalently express the vote for the ith cell of the kth AN as $v_{k,i}=v_{n_x,n_y}{}^k$.

The difference between the number of ANs that vote for 1 and 0 for the ith cell can be calculated as $$\Delta_i \overset{\Delta}{=} \sum_{k=1}^{K} 2v_{k,i} - 1. \tag{1}$$

FIG. 1 is a graph of an example of majority vote (MV)-based localization for a 2D case. As illustrated in FIG. 1, the cell with the highest number of votes is called the MV cell and its index can be obtained as $$i_{max} \overset{\Delta}{=} \arg \max_{i \in \{0, \ldots, N_g^2-1\}} \Delta_i. \tag{2}$$

In [2], the SN obtains the votes for each AN and each cell through orthogonal channels. Hence, the SN is aware of the local data of ANs to calculate (2). As opposed to the method in [2], our main objective is to calculate $\Delta i$ by using an OAC method that inherently promotes privacy via the signal superposition property of multiple access channels.

B. Signal Model: Circularly-Shifted Chirps Based OAC

In this presently disclosed subject matter, we use CSCs to compute MVs via OAC. In [11], it is shown that a chirp signal can be synthesized through a discrete Fourier transform (DFT)-spread OFDM (DFT-s-OFDM) transmitter with a special choice of frequency-domain spectral shaping (FDSS) with the motivation of its compatibility to 3GPP 4G LTE and 5G NR. By using this synthesis method, each AN generates the mth CSC symbol as $$t_{k,m} = F_N^H M_f \text{diag}\{f\} D_M d_{k,m}, \tag{3}$$

where $t_{k,m} \in \mathbb{C}^N$ is the mth transmitted baseband signal in discrete time for the kth AN, $d_{k,m} \in \mathbb{C}^M$ contains the symbols on M bins, $D_M \in \mathbb{C}^{M \times M}$ is the orthonormal M-point DFT matrix, $f \in \mathbb{C}^M$ is the FDSS vector to synthesize chirps, $M_f \in \mathbb{R}^{N \times M}$ is the mapping matrix that maps the output of the DFT precoder to a set of subcarriers, and $F_N^H \in \mathbb{C}^{N \times N}$ is the orthonormal N-point inverse DFT (IDFT) matrix. In [11], it is shown that $t_{k,m}$ is the baseband signal of a linear combination of linear CSCs where the amount of frequency sweep for each CSC is $D/T_{chirp}$ for symbol duration $T_{chirp}$ if the vector f is expressed as $f=[c_{L_d}, \ldots, c_{L_u}]^T \times \sqrt{M/\Sigma_{j=L_d}^{L_u}|c_j|^2}$, where $c_j$ is given by $$c_j = \gamma_j(C(\alpha_j) + C(\beta_j) + jS(\alpha_j) + jS(\beta_j)), \tag{4}$$

where $C(\cdot)$ and $S(\cdot)$ are the Fresnel integrals with cosine and sine functions, respectively, $$\alpha_j = (D/2 + 2\pi j)/\sqrt{\pi D}, \beta_j = (D/2 - 2\pi j)/\sqrt{\pi D}, \gamma_j = \sqrt{\frac{\pi}{D}} e^{-j\frac{(2\pi j)^2}{2D} - j\pi j}$$

for $j \in \{L_d, \ldots, L_u\}$, $L_d \leq -D/2$, $L_u \geq D/2$, and $L_u - L_d + 1 = M$. The M input indices of the DFT-s-OFDM transmitter corresponds to the M CSCs within the symbol duration.

We assume that each individual AN transmission has an average received power of 1 Watt and the cyclic prefix (CP) duration is larger enough to compensate for the maximum delay of the channel and synchronization errors. Assuming that all ANs transmit simultaneously for OAC, the mth received baseband signal in discrete-time can be written as $$r_m = \sum_{k=0}^{K-1} H_k t_{k,m} + n_m, \qquad (5)$$

where $H_k \in \mathbb{C}^{N \times N}$ is a circular-convolution matrix based on the DFT of the channel impulse response (CIR) of the channel between k AN and SN, and $n_m \sim \mathbb{C} \mathcal{N} (0_N, \sigma_n^2 I_N)$ is the additive white Gaussian noise (AWGN). At the SN, the aggregated symbols on the bins of the mth OFDM symbol can be expressed as $$\tilde{d}_m = D_M^H M_f^H \mathrm{diag}\{f^H\} F_N r_m, \qquad (6)$$

where $\tilde{d}_m \in \mathbb{C}^M$ are the received symbols on the mth symbol.

In this present disclosure, we consider potential time synchronization errors at SN and ANs. The time synchronization of the ANs may not be precise, resulting in imprecise time-of-arrivals at the SN. The time-of-arrival of each AN is chosen randomly from 0 to $N_{arr}$ samples with equal probability. Thus, $T_{arr} = N_{arr} T_{sample}$ is the maximum difference between the time-of-arrivals. We assume that the synchronization point at the SN can deviate by $N_{err}$ samples in the time domain. Thus, $T_{err} = N_{err} T_{sample}$ is the maximum time difference from the synchronization point at the SN. The maximum delay caused by the imperfect time-synchronization is $T_{sync} = T_{arr} + T_{err}$ seconds. Since a translation in the time domain results in modulations in the frequency domain, we also introduce corresponding phase rotations in the frequency domain to model the impact of synchronization errors.

C. Notations for Functions and Sequences

Let $f$ be a binary function that maps $\mathbb{Z}_2^{2m} = \{x_1, x_2, \ldots, x_m, y_1, y_2, \ldots, y_m | \forall x_j, y_j \in \mathbb{Z}_2\}$ to $\mathbb{Z}_2$. Similarly, let g be a pseudo-Boolean function that maps $\mathbb{Z}_2^m$ to $\mathbb{R}$. In this present disclosure, to simplify the notation, we use • on top of a function to denote a function that maps the non-negative integers in i, $j \in \mathbb{Z}_{2^m}$ to the co-domain of $f$ as $\dot{f}(i, j) \triangleq f(e^{-1}(i), e^{-1}(j))$, where $i = e(x) \triangleq \sum_{j=1}^m {}^m x_j 2^{m-j}$ and $j = e(y) \triangleq \sum_{j=1}^m {}^m y_j 2^{m-j}$ for $x \triangleq (x_1, x_2, \ldots, x_m)$ and $y \triangleq (y_1, y_2, \ldots, y_m)$. In other words, i and j are the decimal representations of the binary numbers constructed by using all elements in the sequence x and the sequence y, where the most significant bits are $x_1$ and $y_1$, respectively. Similarly, $\tilde{g}$ maps $i \in \mathbb{Z}_{2^m}$ to the co-domain of g as $\tilde{g}(i) \triangleq g(e^{-1}(i))$.

III. PRIVACY-PRESERVING DISTRIBUTED LOCALIZATION WITH OAC

In this section, we first introduce the presently disclosed encoder that allows us to transmit more votes with CSCs for OAC as compared to the one in [9]. We then discuss the decoder for privacy-preserving distributed localization and methods that enhance the performance in practice.

FIG. 2 is an example of a presently disclosed algorithm for localization.

A. Transmitter

1) Encoding: At the kth AN, the $N_g^2$ votes are partitioned into G group of length $N_v$, where the gth group is denoted by a sequence of votes $v_k \triangleq (v_k, (g-1) N_v + 1, \ldots, v_k, gN_v)$ for $g \in \{0, 1, \ldots, G-1\}$ and the last group is padded with the vote 0 if $N_g^2$ is not integer multiples of $N_v$. Without loss of generality, we focus on encoding the gth group of votes. Let $s_k \triangleq e(v_k)$ be the decimal value of the binary representation $v_k$. The representation $v_k$ can be encoded to a polynomial representation $p_k$ (z) such that only the $s_k$th term has a non-zero coefficient. The polynomial $p_k$ (z) can be expressed as $$p_k(z) \triangleq \sum_{s=0}^{2^{N_v}-1} \tilde{f}(s, s_k) z^s, \qquad (7)$$

where $\tilde{f}(s, s_k)$ is the coefficient of the sth term and the desired function $\tilde{f}(s, s_k)$ is defined as $$\tilde{f}(s, s_k) = \begin{cases} 1, & s = s_k \\ 0, & s \neq s_k \end{cases}. \qquad (8)$$

2) Modulation: Let $N_s$ denote the total number of CSC symbols to transmit $N_g^2$ votes and the symbols are indexed by $m \in \{0, 1, \ldots, N_s-1\}$. Let M be an integer multiple of B. We then partition the CSC indices within one CSC symbol into B blocks indexed by $b \in \{0, 1, \ldots, B-1\}$ for $M_b = M/B$. Each block is further split into $S = 2^{N_v}$ subblocks indexed by $s \in \{0, 1, \ldots, S-1\}$ for $M_{sb} = M_b/S$. Let $\mathcal{M}$ be a predefined function that maps the group index g to a distinct pair $(m_g, b_g)$ for $m_g \in \mathbb{Z}_{N_s}$ and $b_g \in \mathbb{Z}_B$. The coefficient $\tilde{f}(s, s_k)$ of the sth term of the polynomial in (8) acts as a switch to activate or deactivate the sth subblock within the $b_g$th block for the $m_g$th symbol.

If the corresponding bin of a CSC index carries a symbol, it is designated as an active CSC; otherwise, it is designated as an inactive CSC. After activating the $s_{k,g}$th subblock, only the first CSC of the corresponding subblock is activated and the rest of the $M_g = M_b/S - 1$ CSCs are deactivated. Deactivating CSCs corresponding to the adjacent $M_g$ indices provides a guard period of $T_g = M_g T_{chirp}/M$ between the activated CSCs in the time domain. The guard period protects against interference due to the delay spread of the channel, and imperfect time synchronization. To ensure negligible interference, choosing $M_g$ under the condition specified by $$T_g = \frac{M_g T_{chirp}}{M} \geq T_{chn} + T_{sync}, \qquad (9)$$

must be maintained, where $T_{chn}$ is the maximum delay of the channel. For the kth AN, we denote the vector $d_{m,b,s}^{(k)}$ to represent the symbols of the $(1+M_g)$ bins for the sth subblock of a given symbol and block index pair (m, b). We set the following symbols as $$d_{m_g, b_g, s}^{(k)} = \sqrt{M_b}\, p_{k,g} \underbrace{[1, 0, \ldots, 0]}_{M_g}; \forall\, g,$$

where $p_{k,g}$ is a random symbol on the unit circle. Therefore each symbol can carry $M_v = B N_v$ votes in total.

B. Receivers

1) Demodulation: Without loss of generality, we focus on detecting the gth group of aggregated votes. The mapping function $\mathcal{M}$ is assumed to be known at the receiver so that the corresponding symbol and block indices $(m_g, b_g)$ are known. $\forall s$, we calculate the energy of the superposed symbols in the sth subblock as $$\tilde{g}_{sup}(s) \triangleq \|\tilde{d}_{m_g, b_g, s}\|^2. \tag{10}$$

For the sake of analysis, assume a flat-fading Rayleigh channel that changes randomly for the next symbol. In this case, $\tilde{g}_{sup}(s)$ term is an exponential distribution.

2) Decoding: The polynomial presentation for the gth vote at the receiver can be expressed as $$\tilde{P}_g(z) = \sum_{s=0}^{2^{N_v}-1} \left\| \sum_{k=1}^K h_k\left(\tilde{f}(s, s_k)\right) + n_s \right\|^2 z^s$$

$$= \sum_{s=0}^{2^{N_v}-1} \left\| \sum_{k=1}^K h_k\left(f(x, y_k)\right) + n_s \right\|^2 z^s, \tag{11}$$

where $h_k$ is the corresponding channel coefficient for the kth user and $n_s$ is the noise term for the sth subblock.

Therefore, $\tilde{g}_{sup}(s) \triangleq g_{sup}(x) = \|\sum_{k=1}^K h_k(f(x, y_k)) + n_s\|^2$. For the ith cell, assume that $K^+$ ANs vote with 1 and $K^-$ ANs vote with 0. By the definition of $v_k$ in Section III-A1, we can also obtain the ath element of $v_k$ as $a=(g-1)N_v-i$. The presently disclosed decoder then compares the energies of the subblocks for $x_a=0$ with that of $x_a=1$ to obtain the decision metric of the ith MV as $$\tilde{\Delta}_i = \sum_{\substack{x \in \mathbb{Z}_2^{N_v} \\ x_a=1}} g_{sup}(x) - \sum_{\substack{x \in \mathbb{Z}_2^{N_v} \\ x_a=0}} g_{sup}(x). \tag{12}$$

At the receiver side, the cell with the most votes is the most likely location for the server, and the SN can be assumed to be at the center of the cell. The index with the most votes can then be determined by $$\tilde{i} = \arg \max_{i \in \{0, \ldots, N_g^2 - 1\}} \tilde{\Delta}_i. \tag{13}$$

From $\tilde{i}$, we can determine the corresponding x-axis and y-axis indices of the target cell as $\tilde{n}_x$ and $\tilde{n}_y$, respectively.

Equation (13) differs from (2) due to the incoherent nature of the presently disclosed scheme. From the identity $\mathbb{E}[|X+Y|^2] = \mathbb{E}[|X|^2] + \mathbb{E}[|Y|^2]$ for some normal distribution X and Y, and using (8), the expected value of the first term of the right-hand side of (12) can be expressed as $$\mathbb{E}\left[ \sum_{\substack{x \in \mathbb{Z}_2^{N_v} \\ x_a=0}} g_{sup}(x) \right] = \sum_{k \in \mathbb{K}_a^+} \mathbb{E}\left[\|h_k\|^2\right] + 2^{N_v-1} \mathbb{E}\left[\|n_s\|^2\right] \tag{14}$$

$$= 2K_a^+ + 2^{N_v-1}\sigma_n^2.$$

Similarly, $$\mathbb{E}\left[ \sum_{\substack{x \in \mathbb{Z}_2^{N_v} \\ x_a=1}} g_{sup}(x) \right] = 2K_a^- + 2^{N_v-1}\sigma_n^2. \tag{15}$$

By using (14) and (15), we can then show $$\mathbb{E}[\tilde{\Delta}_i] = 2(K_a^+ - K_a^-) = 2\tilde{\Delta}_i. \tag{16}$$

Hence, (12) is an unbiased estimate of $\Delta_i$ and the presently disclosed scheme obtains the cell SN located, probabilistically.

C. Privacy Preservation and Security

The presently disclosed method promotes the privacy of the local data since the OAC superposes the ANs signal and SN only observes the aggregated signal [12]. Hence, SN cannot trivially decode the local data from the aggregated signal when a large number of ANs are involved in the voting process. The presently disclosed scheme also provides security against eavesdroppers as the aggregation depends on the positions of the ANs and the SN and the power alignment may not be maintained if the eavesdroppers and SN are not co-located. Hence, the attacker does not observe the same aggregated data at the SN. Also, the mapping function $\mathcal{M}$ can be encrypted to improve the security of the system further. Lastly, the presently disclosed scheme provides immunity against Byzantine ANs as it relies on the MV principle as discussed in [2].

D. Enhancements

In this section, we presently disclose several methods to address the probabilistic nature of the presently disclosed scheme in order to enhance localization performance.

1) Multiple repetitions: To increase the probability of correct detection in (13), one of the strategies that we consider is to use repetitive transmissions of the votes and obtain the cell index through a median operation. For a total number of $N_r$ repetitions, (13) can be expressed for the $n_r$th repetition as $$\tilde{i}^{(n_r)} = \arg \max_{i \in \{0, \ldots, N_g^2 - 1\}} \tilde{\Delta}_i^{(n_r)}, \tag{17}$$

where $\tilde{\Delta}_i^{(n_r)}$ is the decision metric for the ith cell and the $n_r$th repetition.

The coordinates of the cell with the highest number of votes can be determined as $X_{SN} = \text{median}(X_{SN}^1, \ldots, X_{SN}^{N_r})$ and $Y_{SN} = \text{median}(Y_{SN}^1, \ldots, Y_{SN}^{N_r})$. Note that median is useful to eliminate outliers that occur in fading channel.

2) Iterative method: The resolution of the localization is determined by the selected grid size $N_g$ and the length L. A larger grid size results in a smaller resolution but is computationally more demanding. We utilize an iterative procedure for further refinement. For the iterative procedure, the grid size is chosen small. After the first round of iteration, the SN estimates its location and broadcasts the coordinates to all ANs. For the next iteration, the AN focuses on a smaller area with the estimated location at the center. Let the zoomed region for each iteration be equal to the area of $N_z \times N_z$ cells. For the $n_i$th iteration, the grid size is then updated as $$L^{n_i} = L^{n_i-1} \times \frac{N_z}{N_g}.$$

The AN updates the chosen axes as $$X_{ax}^{n_i} = A_x\left(X_{SN}^{n_i} - \frac{L^{n_i}}{2}, X_{SN}^{n_i} + \frac{L^{n_i}}{2}, N_g\right), \quad (18)$$

and $$Y_{ax}^{n_i} = A_x\left(Y_{SN}^{n_i} - \frac{L^{n_i}}{2}, Y_{SN}^{n_i} + \frac{L^{n_i}}{2}, N_g\right). \quad (19)$$

The ANs continue the voting while taking the new grid into account. Note that the iterative method can also be utilized with multiple repetitions.

Note that there exists an inaccuracy owing to the grid quantization with the presently disclosed scheme. The bound on RMSE based on quantization can be obtained as $L_b = LN_z^{N_{it}-1}/N_g^{N_{it}}$ meters if SN is assumed to be randomly located in the area. The RMSE is given by RMSE=$\sqrt{E[|e|^2]}$, where e is the localization error in meters.

IV. NUMERICAL RESULTS

We consider M=240 subcarriers and set the IDFT size as N=256. ITU Extended Pedestrian A (EPA) is considered for the fading channel with no mobility for each round and the channel variation is considered by regenerating the channel at each communication round. The root-mean-square (RMS) delay spread of the EPA channel is $T_{rms}$=43.1 ns. We also consider that both $N_{arr}$ and $N_{err}$ can vary between zero and one sample. We set $M_g$=4 to make sure that the condition in (9) is maintained.

Figure 3:
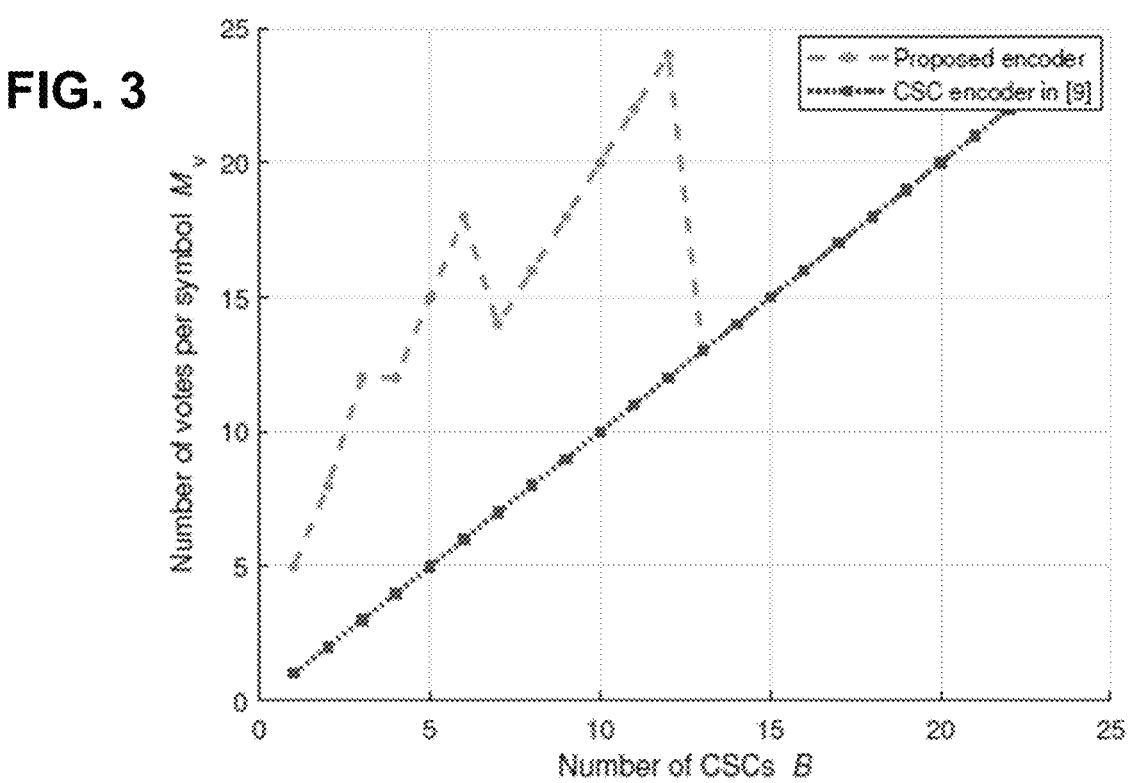
FIG. 3 is a graph of an example of the number of votes per symbol versus the number of circularly-shifted chirps (CSCs) for the CSC-based-majority vote (MV) presently disclosed scheme as compared to the scheme in reference Item No. [9]

FIG. 3 is a graph of an example of the number of votes per symbol versus the number of circularly-shifted chirps (CSCs) for the CSC-based-majority vote (MV) presently disclosed scheme as compared to the scheme in reference Item No. [9]. Thus, in FIG. 3, the relation between the number of CSCs per symbol, i.e., B, and the number of votes per OFDM symbol, i.e., $M_v$, is given for both the presently disclosed encoder subject matter and the encoder mentioned in [9]. The figure shows that the presently disclosed encoders allow a CSC symbol to use more votes than the one in [9]. For instance, for B=2, it shows that the total number of votes per OFDM symbol $M_v$ is 2 and 8 for the presently disclosed and the encoder in [9], respectively. This implies the presently disclosed encoder is four times faster than the one in [9] for B=2 in terms of computation rate. The gain decreases as B increases. For B≥13, both the new and the old encoder can carry the same number of votes.

Figure 4:
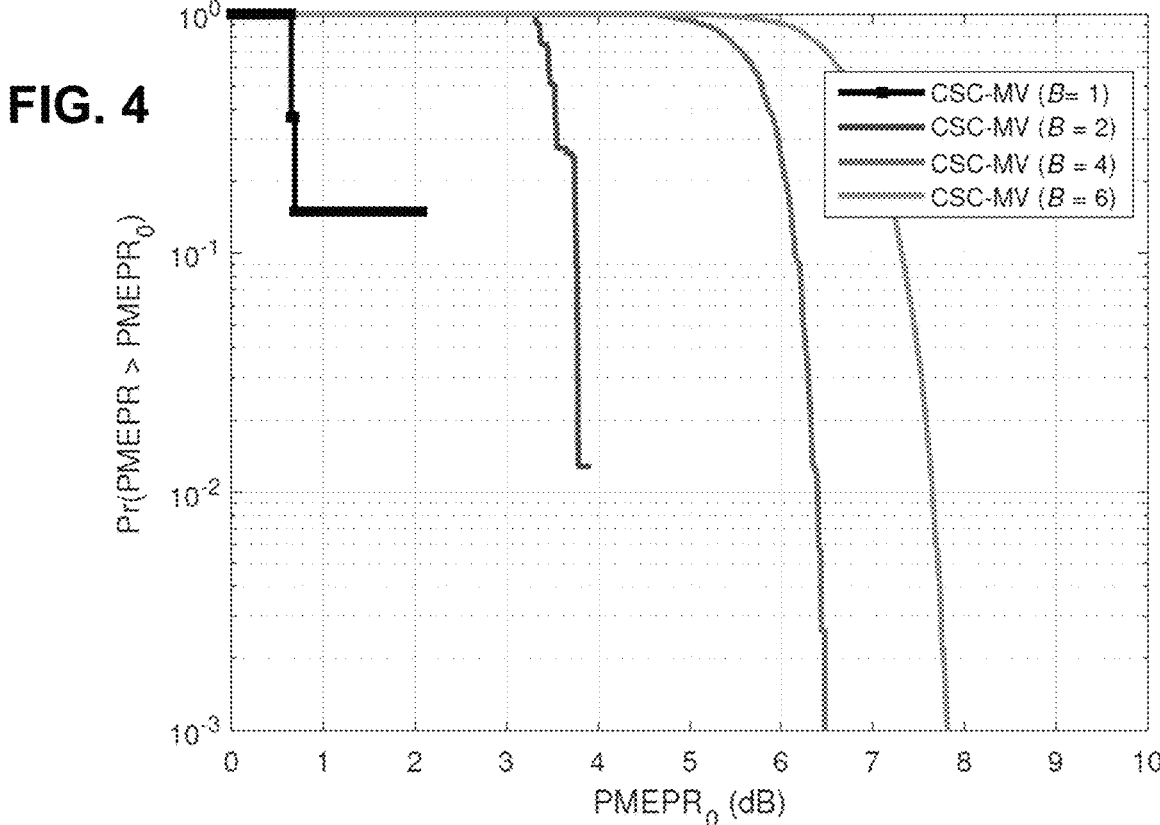
FIG. 4 is a graph of examples of several peak-to-mean envelope power ratio (PMEPR) distributions of transmissions for the presently disclosed scheme (EPA, $N=400$, $K=50$)

FIG. 4 is a graph of examples of several peak-to-mean envelope power ratio (PMEPR) distributions of transmissions for the presently disclosed scheme (EPA, N=400, K=50). The CSCs result in low PMEPR. When B is 1, 2, or 6, the PMEPR is approximately 2 dB, 3 dB, and 8 dB, respectively. This is slightly higher than the theoretical PMEPR, i.e., $\log_{10}$ B dB. The synthesized signal is distorted due to the abrupt frequency change of the linear CSCs within a symbol duration [11]. However, PMEPR can be improved by choosing a very small D or by modifying the FDSS vector f [11].

Figure 5:
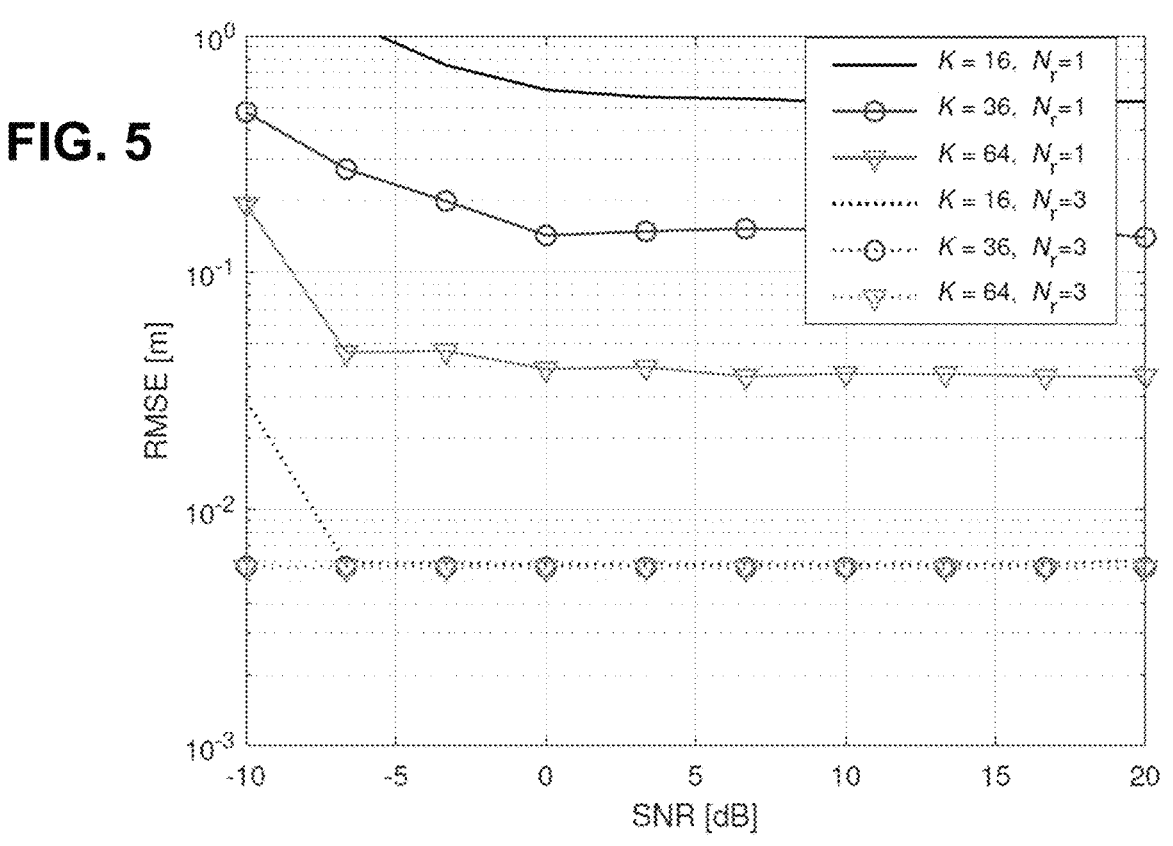
FIG. 5 is a graph of exemplary root-mean-square error (RMSE) versus signal-to-noise ratio (SNR) performance of the presently disclosed localization strategy for $N_r=\{1, 3\}$, $K=\{16, 36, 64\}$, and $N_{It}=3$.

Per FIG. 5 is a graph of exemplary root-mean-square error (RMSE) versus signal-to-noise ratio (SNR) performance of the presently disclosed localization strategy for $N_r$={1, 3}, K={16, 36, 64}, and $N_{it}$=3. The RMSE decreases as the number of repetitions $N_r$ increases. This is because the probability of error lowers with the increasing number of repetitions. FIG. 5 further demonstrates that the RMSE performance increases with the number of devices K.

Figure 6:
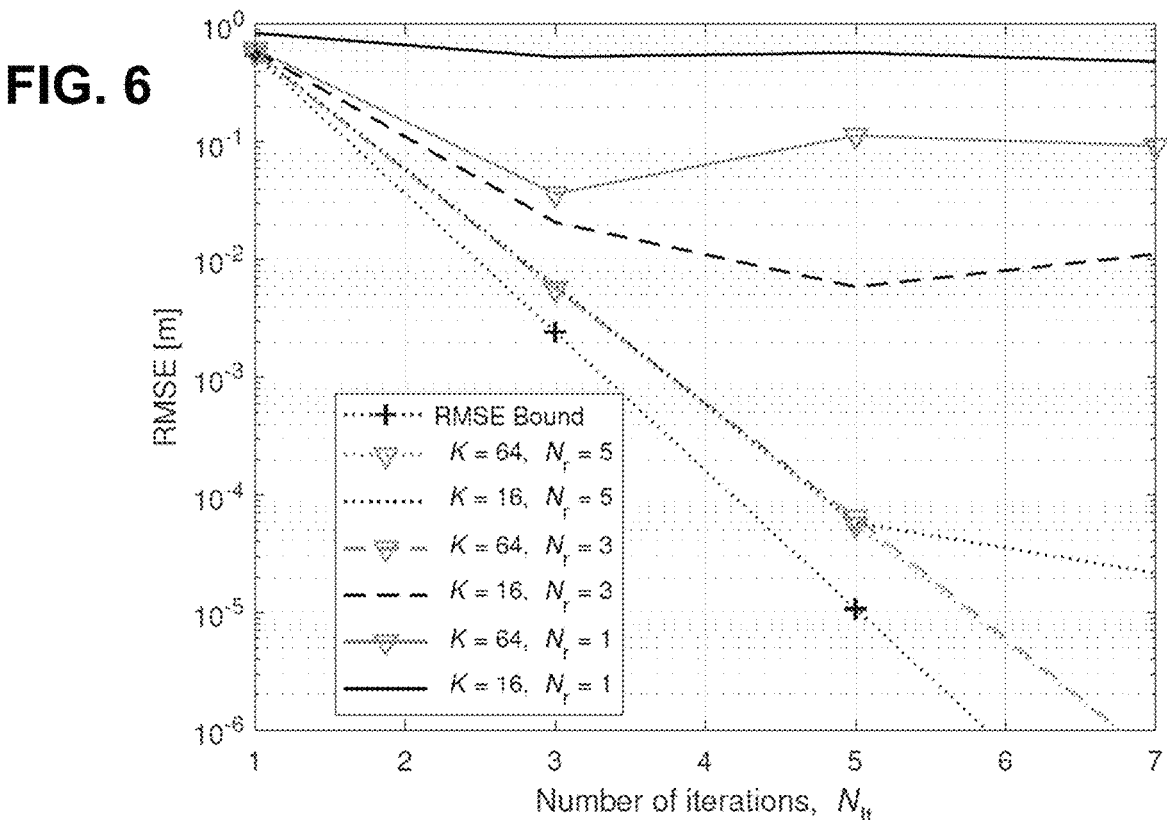
FIG. 6 is a graph of exemplary RMSE versus $N_{It}$ (Iteration) performance compared for $K=\{16, 64\}$ and $N_r=\{1, 3, 5\}$ along with the quantization bound.

In FIG. 6, the RMSE versus $N_{it}$ performance is compared for K={16, 64} and $N_r$={1, 3, 5} along with the quantization bound. For the given parameter set, the RMSE performance is best for K=64 and $N_r$=5 and it performs worst when K=16 and $N_r$=1. The figure shows that the RMSE performance can be improved by either increasing the K or $N_r$. From FIG. 5 and FIG. 6, we can see that the localization strategy fails for $N_r$=1 as the RMSE is high.

Figure 7:
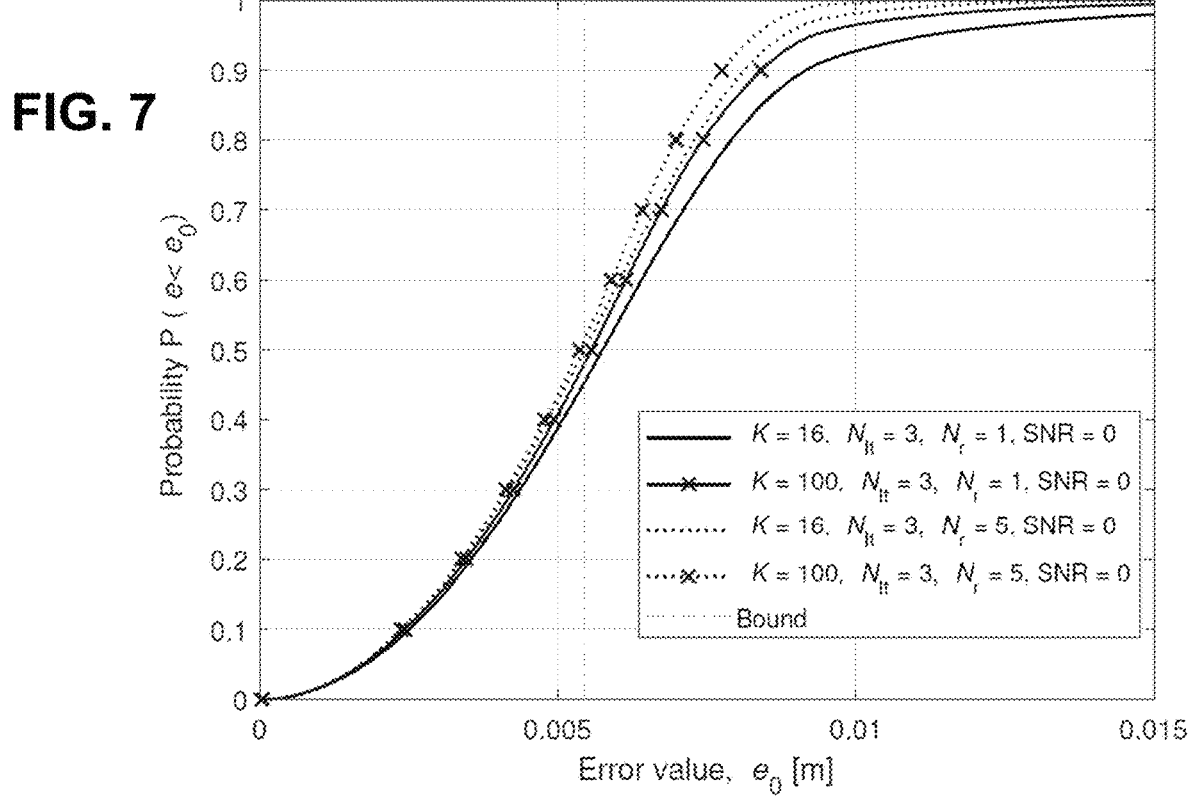
FIG. 7 is a graph of exemplary cumulative distribution function (CCDF) of error probability for $N_r=\{1, 3, 5, 7\}$, with $K=\{16, 100\}$ for $SNR=0$ dB in accordance with the presently disclosed subject matter.

FIG. 7 is a graph of exemplary cumulative distribution function (CCDF) of error probability for $N_r$={1, 3, 5, 7}, with K={16, 100} for SNR=0 dB in accordance with the presently disclosed subject matter. The error is within the range of the bound with a probability of 99.99%. The overall RMSE is however impacted by a very small percentage of outlier errors that result in a significant amount of inaccuracy. The probability of getting an outlier drops substantially as the number of repetitions $N_r$ increases.

V. CONCLUDING REMARKS

In this present disclosure, we disclose a CSC-based OAC for privacy-preserving distributed localization. The key benefit of the presently disclosed encoder is that it improves the spectral efficiency of the encoder in [9] while maintaining the power efficiency of chirps along with the non-coherent detection method that does not rely on CSI and perfect time synchronization. Numerical results show that increasing the number of ANs, iterations, and/or repetitions achieves higher localization accuracy. The presently disclosed concept can be extended to 3D localization. In the future, the presently disclosed concept will be tested and fortified against various types of adversarial attacks.

While certain embodiments of the disclosed subject matter have been described using specific terms, such description is for illustrative purposes only, and it is to be understood that changes and variations may be made without departing from the spirit or scope of the subject matter.

REFERENCES

[1] T. He, C. Huang, B. M. Blum, J. A. Stankovic, and T. Abdelzaher, "Range-free localization schemes for large scale sensor networks," in Proc. ACM International Conference on Mobile Computing and Networking. New York, NY, USA: Association for Computing Machinery, 2003, pp. 81-95.

[2] D. Liu, P. Ning, and W. K. Du, "Attack-resistant location estimation in sensor networks," in IPSN 2005. Fourth International Symposium on Information Processing in Sensor Networks, 2005. IEEE, 2005, pp. 99-106.

[3] T. Shu, Y. Chen, J. Yang, and A. Williams, "Multi-lateral privacy-preserving localization in pervasive environments," in IEEE INFOCOM 2014—IEEE Conference on Computer Communications. IEEE, 2014, pp. 2319-2327.

[4] X. Shi, F. Tong, W.-A. Zhang, and L. Yu, "Resilient privacy-preserving distributed localization against dishonest nodes in internet of things," *IEEE Internet of Things Journal*, vol. 7, no. 9, pp. 9214-9223, 2020.

[5] G. Zhu, Y. Wang, and K. Huang, "Broadband analog aggregation for low-latency federated edge learning," IEEE Trans. Wireless Commun., vol. 19, no. 1, pp. 491-506, January 2020.

[6] G. Zhu, Y. Du, D. Gunduz, and K. Huang, "One-bit over-the-air aggregation for communication-efficient federated edge learning: Design and convergence analysis," *IEEE Trans. Wireless Commun.*, vol. 20, no. 3, pp. 2120-2135, November 2021.

[7] A. Sahin, B. Everette, and S. Hoque, "Distributed learning over a wireless network with FSK-based majority vote," in *Proc. IEEE International Conference on Advanced Communication Technologies and Networking (CommNet)*, December 2021, pp. 1-9.

[8]_____, "Over-the-air computation with DFT-spread OFDM for federated edge learning," in *Proc. IEEE Wireless Communications and Networking Conf. (WCNC)*, April 2022, pp. 1-6.

[9] S. Hoque, M. H. Adeli, and A. Sahin, "Chirp-based over-the-air computation for long-range federated edge learning," in *Proc. IEEE International Symposium on Personal, Indoor and Mobile Radio Communications (PIMRC)*, September 2022, pp. 1-7.

[10] J. D. Gibson, *Mobile communications handbook*. CRC press, 2012.

[11] A. Sahin, N. Hosseini, H. Jamal, S. S. M. Hoque, and D. W. Matolak, "DFT-Spread-OFDM-based chirp transmission," *IEEE Communications Letters*, vol. 25, no. 3, pp. 902-906, 2021.

[12] H. Hellstrom, J. M. B. da Silva Jr., M. M. Amiri, M. Chen, V. Fodor, H. V. Poor, and C. Fischione, "Wireless for machine learning: A survey," *Foundations and Trends in Signal Processing*, vol. 15, no. 4, pp. 290-399, 2022.

What is claimed is:

1. An over-the-air computation methodology for privacy-preserving localization in a sensor network without using channel state information (CSI) at a plurality of anchor nodes (ANs) or at a server node (SN), comprising:

providing an over-the-air computation network with superposed update vectors received at a server node (SN) as transmitted from a plurality of anchor nodes (ANs), wherein the superposed update vectors comprise the superposed local vectors of votes;

providing one or more processors; and providing one or more non-transitory computer-readable media that store instructions that, when executed by the one or more processors, cause the one or more processors to perform operations, the operations comprising:

transmitting local vectors as anchor node (AN) votes, encoding the potential location of the server node (SN), from each respective anchor node of the plurality of anchor nodes (ANs), receiving the superposed update vector at the server node (SN), and determining the majority vote (MV) for each element of the superposed update vector at the server node (SN) by aggregating the local vectors through superposition at the SN for computing the MV votes using non-coherent energy detection, wherein the MV votes are detected non-coherently without requiring an ideal time-synchronization or channel state information (CSI), wherein the transmitted local vectors comprise respective baseband circularly-shifted chirp (CSC) signals, the respective circularly-shifted chirp (CSC) signals being synthesized at the respective anchor nodes (ANs) through a discrete Fourier transform (DFT)-spread orthogonal frequency division multiplexing (OFDM) transmitter using frequency-domain spectral shaping (FDSS), each transmitted simultaneously from all of the anchor nodes (ANs).

2. The over-the-air computation methodology according to claim 1, wherein the operations further comprise using non-coherent energy detection for voting-based distributed localization determination.

3. The over-the-air computation methodology according to claim 2, the operations further comprising:

providing a distributed learning application; and inputting the majority votes (MVs) into the distributed learning application for updating the application.

4. The over-the-air computation methodology according to claim 3, wherein the distributed learning application comprises federated edge learning (FEEL).

5. The over-the-air computation methodology according to claim 1, wherein the sensor network comprises a wireless sensor network (WSN) comprising a portion of an Internet-of-Things (IoT) network.

6. The over-the-air computation methodology according to claim 1, wherein the operations further comprise refining the anchor node (AN) votes using multiple transmit iterations.

7. The over-the-air computation methodology according to claim 1, wherein the SN is mobile and the operations further comprise using multiple transmit iterations and multiple transmit repetitions to enhance localization resolution and increase detection probability.

8. The over-the-air computation methodology according to claim 1, wherein the server node and each anchor node (AN) are respectively equipped with a single antenna.

9. The over-the-air computation methodology according to claim 1, wherein the operations further comprise that each anchor node (AN) is aware of its location through use of a Global Positioning System (GPS) or through having a fixed location configuration.

10. The over-the-air computation methodology according to claim 9, wherein the operations further comprise that each anchor node (AN) can respectively measure its distance from the SN.

11. The over-the-air computation methodology according to claim 10, wherein the operations further comprise that the anchor nodes (ANs) respectively measure distance from the SN by using methodology based on one of (1) received signal strength indicator (RSSI), (2) time of arrival (ToA), or (3) time difference of arrival (TDoA).

12. An over-the-air computation system for privacy-preserving localization in a sensor network without using channel state information (CSI) at a plurality of anchor nodes (ANs) or at a server node (SN), comprising:

an over-the-air computation network to process superposed update vectors received at a server node (SN) as transmitted from a plurality of anchor nodes (ANs), wherein the superposed update vectors comprise the superposed local vectors of votes;

one or more processors; and one or more non-transitory computer-readable media that store instructions that, when executed by the one or more processors, cause the one or more processors to perform operations, the operations comprising:

transmitting local vectors as votes, encoding the potential location of the server node (SN), from each respective anchor node of the plurality of anchor nodes (ANs), receiving the superposed update vector at the server node (SN), and determining the majority vote (MV) for each element of the superposed update vector at the server node (SN) by aggregating the local vectors through superposition at the SN for computing the MV votes using non-coherent energy detection, wherein the MV votes are detected non-coherently without requiring an ideal time-synchronization or channel state information (CSI), wherein the transmitted local vectors comprise respective baseband circularly-shifted chirp (CSC) signals, the respective circularly-shifted chirp (CSC) signals being synthesized at the respective ANs through a discrete Fourier transform (DFT)-spread orthogonal frequency division multiplexing (OFDM) transmitter using frequency-domain spectral shaping (FDSS), each transmitted simultaneously from all of the anchor nodes (ANs).

13. The over-the-air computation system according to claim 12, wherein the operations further comprise using non-coherent energy detection for voting-based distributed localization determination.

14. The over-the-air computation system according to claim 13, the operations further comprising:

providing a distributed learning application; and inputting the majority votes (MVs) into the distributed learning application for updating the Model parameters.

15. The over-the-air computation system according to claim 14, wherein the distributed learning application comprises federated edge learning (FEEL).

16. The over-the-air computation system according to claim 12, wherein the sensor network comprises a wireless sensor network (WSN) comprising a portion of an Internet-of-Things (IoT) network.

17. The over-the-air computation system according to claim 12, wherein the operations further comprise refining the anchor node (AN) votes by using multiple transmit iterations.

18. The over-the-air computation system according to claim 12, wherein the SN is mobile and the operations further comprise using multiple transmit iterations and multiple transmit repetitions to enhance localization resolution and increase detection probability.

19. The over-the-air computation system according to claim 12, wherein the server node and each anchor node (AN) are respectively equipped with a single antenna.

20. The over-the-air computation system according to claim 12, wherein the operations further comprise that each anchor node (AN) is aware of its location through use of a Global Positioning System (GPS) or through having a fixed location configuration.

21. The over-the-air computation system according to claim 20, wherein the operations further comprise that each anchor node (AN) can respectively measure its distance from the SN.

22. The over-the-air computation system according to claim 21, wherein the operations further comprise that the anchor nodes (ANs) respectively measure distance from the SN by using methodology based on one of (1) received signal strength indicator (RSSI), (2) time of arrival (ToA), or (3) time difference of arrival (TDoA).

* * * * *